United States Patent
Ramamurthy et al.

(10) Patent No.: US 7,292,580 B2
(45) Date of Patent: Nov. 6, 2007

(54) METHOD AND SYSTEM FOR GUARANTEEING QUALITY OF SERVICE IN A MULTI-PLANE CELL SWITCH

(75) Inventors: Gopalakrishnan Ramamurthy, West Windsor, NJ (US); Gopalakrishnan Meempat, East Brunswick, NJ (US); William J. Dally, Stanford, CA (US)

(73) Assignee: LSI Corporation, Milpitas, CA (US)

( * ) Notice: Subject to any disclaimer, the term of this patent is extended or adjusted under 35 U.S.C. 154(b) by 923 days.

(21) Appl. No.: 10/325,700

(22) Filed: Dec. 18, 2002

(65) Prior Publication Data

US 2003/0227926 A1 Dec. 11, 2003

Related U.S. Application Data

(60) Provisional application No. 60/387,394, filed on Jun. 10, 2002.

(51) Int. Cl.
*H04L 12/56* (2006.01)
(52) U.S. Cl. .................. 370/395.42; 370/235; 370/417
(58) Field of Classification Search ................ 370/230, 370/230.1, 235, 386, 387, 388, 395.1, 395.21, 370/395.41, 395.42, 395.43, 412–414, 417, 370/418
See application file for complete search history.

(56) References Cited

U.S. PATENT DOCUMENTS 5,757,771 A * 5/1998 Li et al. ..................... 370/235
(Continued)

FOREIGN PATENT DOCUMENTS

EP 681385 A2 * 11/1995
(Continued)

OTHER PUBLICATIONS

McKeown, N., "The iSLIP Scheduling Algorithm for Input-Queued Switches," IEEE/ACM Transactions on Networking, Apr. 1999. vol. 7, iss. 2, pp. 188-201.*

(Continued)

*Primary Examiner*—Wellington Chin
*Assistant Examiner*—Donald L Mills
(74) *Attorney, Agent, or Firm*—Christopher P Maiorana PC

(57) ABSTRACT

Data cells of plural classes are transferred from input ports to output ports through a switch by storing the cells at each input port in class-specific virtual output queues (VOQ) within sets of VOQs associated with output ports, and providing credits to VOQs according to class-associated guaranteed bandwidths. When a cell is received at a VOQ having credits, a high-priority request for transfer is generated. If a cell is received at a VOQ that does not have any available credits, a low-priority request for transfer is generated. In response to requests, grants are issued to VOQ sets without regard to class, high-priority requests being favored over low-priority requests. When a grant is received for a particular VOQ set, an arbitrator selects a VOQ from the set, giving priority to VOQs having credits over VOQs without credits, and a cell from the selected VOQ is transferred. Requests generated from all input ports are forwarded to a central scheduler associated with a switch fabric slice, the central scheduler issuing the grants. The switch fabric may comprise multiple slices and a central scheduler, across which requests may be distributed in parallel, for example, the switch fabric slices being selected in a fixed order. While all high-priority requests are granted, low priority requests may be granted by the central scheduler according to a weighted fair share policy.

34 Claims, 12 Drawing Sheets

U.S. PATENT DOCUMENTS

| | | | |
|---|---|---|---|
| 5,850,399 A * | 12/1998 | Ganmukhi et al. | 370/412 |
| 6,067,298 A * | 5/2000 | Shinohara | 370/395.71 |
| 6,188,698 B1 * | 2/2001 | Galand et al. | 370/412 |
| 6,246,687 B1 | 6/2001 | Siu | |
| 6,359,861 B1 | 3/2002 | Siu et al. | |
| 6,950,396 B2 * | 9/2005 | Assa et al. | 370/230.1 |
| 2001/0023469 A1 * | 9/2001 | Jeong et al. | 710/241 |
| 2001/0033581 A1 * | 10/2001 | Kawarai et al. | 370/468 |
| 2002/0048280 A1 * | 4/2002 | Lee et al. | 370/468 |
| 2002/0057712 A1 * | 5/2002 | Moriwaki et al. | 370/463 |

FOREIGN PATENT DOCUMENTS

EP   967828 A2 * 12/1999

OTHER PUBLICATIONS

Motoki, A. et al., "Group-Pipeline Scheduler for Input-buffer Switch," Joint 4th IEEE International Conference on ATM and High Speed Intelligent Internet Symposium (ICATM 2001), Apr. 2001. pp. 158-162.*

* cited by examiner

METHOD AND SYSTEM FOR GUARANTEEING QUALITY OF SERVICE IN A MULTI-PLANE CELL SWITCH

RELATED APPLICATION(S)

This application claims the benefit of U.S. Provisional Application No. 60/387,394, filed Jun. 10, 2002 for "Large Capacity Switching System," by Gopal Meempat, G. Ramamurthy, William J. Dally and Martin Braff. The entire teachings of the above application are incorporated herein by reference.

BACKGROUND OF THE INVENTION

Large capacity packet switches and routers are generally of the input output buffered type, where input and output port modules are interconnected via a large switch fabric. To scale the switch fabric to large number of ports (greater than 100), with each port operating at speeds of several Giga bits/sec each, the most scalable switch fabric is a cross bar switch fabric. The input and output port modules are themselves large shared memory switches. The cross bar switch fabric has N input and N output ports. Each input port is attached to an input port module that buffers traffic in large shared memory buffers. Similarly each output port is attached to an output port module that buffers traffic. The input and output port modules may have a single high speed port or multiple lower speed subports.

To achieve high efficiency and support QoS, variable length packets are segmented into fixed length packets or cells in the input port modules, and are switched to the output port modules via the cross bar switch. At the output port module, the cells are reassembled into their respective packets.

To increase the switching capacity, multiple cross bar switches (or switch slices) may be connected in parallel. In this case, the cells from the input module are distributed across the multiple switch fabric slices in a load-sharing manner. Associated with each switch fabric slice is a central cross bar scheduler. In the case of multiple parallel switch fabric slices, all the cross bar schedulers work independently.

In general, in a large switching complex, quality of service (QoS) management is typically the responsibility of the traffic managers and/or network processors, and it is sufficient if the switch fabric resolves contention based on static priorities. This is indeed true if there are no bottlenecks in the switch, or the probability of contention is very small.

However, in a large switch, with asymmetric or hotspot loading, and many input ports/streams contending for the same resources, there can be multiple bottlenecks. Simple mechanisms such as static priority scheduling will not guarantee QoS for all classes of traffic because performance of lower priority classes is sacrificed in favor of higher priority traffic classes, leading to significant degradation of QoS for lower priority traffic classes.

A common practice is to classify traffic into one of M traffic classes and use class-based scheduling at input and output port modules. However, the schedulers in the input and output port modules guarantee QoS only over the local bottleneck, namely the link between the input port module and the switch fabric, and the link between the output port module and down stream traffic manager devices respectively. The responsibility of resolving conflicts between input port modules for common resource in the cross bar fabric falls on the central cross bar scheduler. Since the central scheduler has to maintain global information, and must schedule N times as fast as the input and output schedulers, providing a multi-class centralized scheduler is not a scalable solution as the number of cross bar ports and the speed of the cross bar ports increase.

SUMMARY OF THE INVENTION

For exemplary purposes, assume that cells are 64 bytes, and that the transfer rate across the switch is 2.5 Gbps. Then the time required to transmit the 64-bit cell, i.e., the "cell time", is approximately 205 nsecs. Thus, contention conflicts must be resolved within 205 nsecs. If there are N input port modules, and M classes, then there could potentially be up to N×M requests generated every 205 nsecs.

Typically, requests which include class information are sent to a central scheduler, which maintains all of the required credit mechanisms. Thus, requests are generated, each request for a specific output and class. In response to the received requests, the central scheduler resolves all conflicts and issues grants that are specific to output and class. The input modules receiving the grants then transmit cells for the specific classes for which grants were issued.

As the number of ports increases, it is no longer possible to resolve all of the contention at a central location (i.e., the central scheduler) in the relatively small time slot (e.g., 205 nsecs). Further, as the port count increases, the resulting state space (N ports×M classes) becomes unmanageable as N and M increase.

Instead, in an embodiment of the present invention, a state machine is localized within each input port module. Cells of all classes are dynamically mapped to one of two types of requests: high-priority or low-priority, which is typically all that a global scheduler can handle at the high speeds necessary.

One way to perform this mapping is to statically map certain classes to high-priority, and other classes to low-priority. A problem with this method is that the highest priority classes may get all of the bandwidth—that is, in certain circumstances, requests can only be generated to the highest priority class or classes. Thus, a minimum guaranteed bandwidth (MGB) cannot be contracted for or, if already established, cannot be honored.

Instead, an embodiment of the present invention uses dynamic mapping to honor MGBs. The invention is scalable to very large numbers of input and output ports. Channels of flow are created and maintained as bandwidth "pipes". If a bandwidth pipe is not used to its full extent, its unused space is given to other channels, which use weighted shares of the resource.

In a large capacity input output buffered switch, the multiple bottlenecks can lead to poor QoS. In an integrated service network where traffic with different traffic characteristics and service requirements are being switched, strict quality of service (QoS) guarantees must be offered and satisfied. Multi-service traffic is carried in such integrated systems by classifying traffic into classes based on their traffic characteristics and service requirements, and by reserving enough bandwidth for each class at each bottleneck to ensure QoS is satisfied. While the entire system is heterogeneous, the traffic assigned to each class has a more homogeneous behavior.

Reservation of necessary resources at every bottleneck and enforcement of suitable admission control policies ensures that the QoS guarantee for each class is met. The resources required for a given class, for example, can be determined by characterizing the traffic arrival process for each class and computing the equivalent bandwidth required to meet a certain performance expectation, measured in terms of cell loss, cell delay and cell delay jitter.

The admission control process, which includes admission and rejection of new connections and shaping of admitted streams, ensures that the aggregate stream's arrival process parameters are reasonably close to the assumed model parameters. Once the equivalent bandwidth is computed, if this bandwidth is reserved or made dynamically available at every bottleneck for each class of traffic, then end-to-end QoS of service can be guaranteed for every class.

An embodiment of the present invention includes a QoS management architecture for a large capacity input output buffered packet switch. The architecture is based on the philosophy that QoS is a data link layer issue. If the required resources are made available to each traffic class at the data link layer, then higher layers can build a suitable framework for QoS management, and one can talk about service level agreements (SLAs) and guarantees on SLAs.

In the architecture of an embodiment of the present invention, channels of bandwidth are reserved for every class, between every switch input port and output port pair. This reserved bandwidth is referred to as minimum bandwidth guarantee. The schedulers (both the local schedulers in the input and output port modules, and the global schedulers in the switch fabric slice) ensure that these minimum bandwidth guarantees are met in a work-conserving way (that is, if a resource is available, and there are competing requesters for the resource, the resource does not sit idle). Any unused portion of the reserved bandwidth is made available to contending input ports in a weighted fair share manner.

The minimum bandwidth reserved for each class of traffic between a given switch input port and a switch output port is equal to the equivalent bandwidth that is required to meet the QoS guarantees for the class under the current accepted traffic conditions. Thus, if the equivalent bandwidth is computed correctly, the high level call admission controller, policers and shapers execute their function correctly, and the cell switch schedulers deliver the minimum bandwidth guarantees (equal to the equivalent bandwidth), then the promised end-to-end QoS guarantees can be met. Sharing the unused bandwidth between the different traffic classes will enhance the performance beyond what is required. It will also aid those traffic classes (e.g., best effort traffic) that do not make bandwidth reservation.

The cell-based switch architecture of an embodiment of the present invention is implemented in an N×N cross bar switch. The central switch scheduler must compute N schedules in the time it takes to transmit a cell. As cross bar switches become larger (that is, as the port count N increases) and the port speed increases (i.e., the time to compute the N schedules decreases), the implementation complexity of these cross bar schedulers will limit the number of feasible classes that can be scheduled to one or two classes at most. One must either schedule N×M queues and select N disjoint winners, with no input and no output winning more than once in every cell time or repeat the scheduling M times—once for each class.

The input and output port modules can classify traffic into one of M traffic classes. If the number of traffic classes in the input and output port module are larger than two, and there are only two schedulers (physical or logical) in the central cross bar scheduler, the challenge is to map the M (M>2) classes in the input port module to the two classes in the cross bar scheduler.

Generally, prior to the present invention, a static allocation is made where classes 1 to K (K<M, normally representing traffic with real time constraints)) are mapped to one round robin scheduler, and the remaining classes K+1 to M (traffic that do not have latency constraints) are mapped to the second round robin scheduler. (Note that for purposes of implementation the two schedulers can be a single physical scheduler with two priority classes.) A static priority is used between the two aggregated classes in the cross bar scheduler. Such a scheme based on a static mapping and aggregation of traffic classes can significantly compromise the QoS of individual traffic classes, especially if the resources in the cross bar switch are a major bottleneck.

In an embodiment of the present invention, traffic management is based on setting virtual pipes between every input output port pair and for every class. Each virtual pipe is assigned a programmable minimum bandwidth guarantee that is negotiated at call set up time. In addition, a weighted share of any unused bandwidth at the output port, where the weights are again programmable, is made available to each competing input port. The minimum bandwidth guarantees for each class between every input output port pair, and a weighted share of unused bandwidth at the output port is delivered by a pair of working conserving schedulers in the central cross bar scheduler.

The first scheduler is a global round robin scheduler that services high priority requests, while the second scheduler is a global weighted round robin scheduler that services low priority requests. The input port modules (typically the line or trunk card) receive cells from upstream devices, meter or police the cell flows and queue the cells by destination port (output port) and class. Each input port module also generates requests for transmission across the switch fabric, and forwards them to the central cross bar scheduler. If multiple switch fabric units are configured, the input port module distributes the requests across all the associated schedulers in a round robin fashion.

Requests are classified dynamically as high priority or low priority requests by metering the traffic flow via a credit mechanism (that is, priority of a request is not based on its class or determined a priori). If a cell arriving at a given queue conforms to the minimum bandwidth parameters assigned to the queue, the arriving cell will find a free credit and generate a high priority request for service. If the arriving cell does not conform to the minimum bandwidth guarantee parameters, it will not find a free credit on arrival and will instead generate a low priority request for service. The average rate at which high priority requests are generated by a given queue will never exceed the minimum guaranteed rate.

If the sum of the reserved minimum bandwidth guarantees does not exceed any bottleneck in the system, and requests are distributed across multiple slices evenly (in the case there are two or more switch fabric slices), then the high priority scheduler associated with each switch fabric will never be overloaded, and will hence respond with grants with minimum latency. Under backlogged conditions, this ensures that each input module receives a train of grants to a given output port at a rate equal to or greater than the sum of the minimum bandwidth guarantees across all classes (to the specific output port in question). On receipt of a grant by the input port module for a specific output port, a local grant allocator selects the appropriate cell to be transmitted based on whether the queue has issued a high priority request (and hence has credits) or not.

Bandwidth Management

An embodiment of the present invention preserves quality of service (QoS) across a large input/output buffered cross bar-based switch fabric. Channels of guaranteed bandwidth are provided, on a class basis, between every input/output pair. Any unused bandwidth at the switch output port is shared between competing input ports in a weighted fair share manner.

With the establishment of channels or pipes of guaranteed bandwidth between the switch input and output ports, the network processors can manage the bandwidth of the pipes between competing classes and guarantee and maintain end-to-end quality of service within the switching system complex.

Guaranteed Bandwidth

One objective of the present invention is to support a minimum bandwidth guarantee for every class within every input/output pair.

At each input port module, cells are queued in virtual output queues according to each cell's designated output port and class. If the switch supports M classes, then one can say that flow from input port j to output port k for a class i ($i=1,2,\ldots,M$) is guaranteed a throughput of $B_{ijk}$. The value of each $B_{ijk}$ may be set, for example, by the system controller at call setup times.

This guarantee may be realized using a virtual clock-based credit generation mechanism for each class queue $Q_{ijk}$ in the input port module. For each queue $Q_{ijk}$, credits are generated at a rate $B_{ijk}$, equivalent to the minimum bandwidth guarantee for the queue. The input port module individually meters flows by class. Each input port supports N (Output ports)×M (Classes) flows.

Upon the arrival of a cell at an input port, a request for transmission across the switch is generated. Each request may be assigned either a high priority or a low priority. If a credit is available for the cell's flow, a high-priority request is generated and sent to the central scheduler. Otherwise, a low-priority request is generated.

A local load balancer distributes the requests over multiple switch fabrics in a round robin fashion. The central cross bar scheduler associated with each switch fabric comprises a high-priority arbiter and a low-priority arbiter which services low-priority requests only after high priority requests are serviced.

The central scheduler high-priority arbiter is a global scheduler—that is, it receives requests from, and provides round robin scheduling across all input ports. Since the high-priority request rate can never exceed the minimum bandwidth guarantees, so long as the sum of the reserved minimum bandwidths for any output port does not exceed its capacity, the high-priority arbiter will successfully resolve all contentions between competing input ports and generate grants with low latency.

Sharing of Unused Bandwidth

Low-priority requests contend for unused bandwidth at the switch output ports. Intelligent sharing of unused bandwidth increases implementation complexity, especially if based on class (state space of order N×M). An embodiment of the present invention shares unused bandwidth at each output port between contending input ports in a weighted fair share manner that is independent of class. An input port is free to assign a grant (and hence its share of unused bandwidth) to any class queue having traffic to the output port for which the grant was issued.

That is, when a grant for transmission from input port j to output port k is received from the central scheduler, the grant carries only the output port number, but does not specify the class of the originator. This allows the input port module scheduler the flexibility of allocating the grant to any class queue with the same destination port address. The "late binding" of the grant ensures sequential delivery when multiple switch fabric slices are used.

Within an input port module, a grant received from the central scheduler may be assigned in a round robin or static priority fashion to a queue $Q_{ijk}$ ($i=1,2\ldots M$) that has issued a high-priority request (and hence has a credit). If no valid class queue has issued a high-priority request (and hence has no credits), the grant may be assigned in a round robin or static priority fashion to valid queues with no credits but with cells to transmit.

This method of priority request generation and "late binding" of grants ensures minimum bandwidth guarantees are maintained with low latency. That is, a cell that generates a high-priority request can be assigned the earliest grant that arrives following the request generation.

Accordingly, a method of transferring data cells of plural classes from input ports to output ports through a switch includes storing the cells at each input port in class-specific virtual output queues (VOQ) within sets of VOQs associated with output ports, and providing credits to VOQs according to class-associated guaranteed bandwidths. When a cell is received at a VOQ having credits, a high-priority request for transfer is generated. On the other hand, if a cell is received at a VOQ which does not have any available credits, a low-priority request for transfer is generated. In response to requests, grants are issued to VOQ sets without regard to class, high-priority requests being favored over low-priority requests. Finally, when a grant is received for a particular VOQ set (identified by the destination output port), an arbitrator selects a VOQ, giving priority to VOQs having credits over those that do not, and a cell from the selected VOQ is transferred.

Requests generated from all input ports are forwarded to a central scheduler which issues the grants. The central scheduler may comprise multiple slices, across which requests may be distributed in parallel, for example, the slices being selected in a fixed order. While all high-priority requests are granted, low priority requests may be granted by the central scheduler according to a weighted fair share policy.

In one embodiment of the present invention, an input module transmits a cell to each switch fabric every cell time. The cell may carry a valid payload or an empty payload (an idle cell). The cell, in addition, can carry one request, which is routed to the scheduler in the switch fabric. If there are J switch slices, up to J requests (one per slice) can be issued every cell time by an input module.

The payload and request may be valid or invalid independently of the other. A valid request includes at least a reference to the target output for which the request is being made, and the priority of the request.

Generation of some low-priority requests may be delayed, so that if credits become available later, high-priority requests are issued instead. The generation of low-priority requests for a class queue may be delayed, for example, if the number of outstanding requests (i.e., those requests that have been issued and are still waiting for grants) for the class queue exceeds some predetermined threshold.

Requests may be generated upon the arrivals of cells at the switch, or upon the transmission of cells (arrival of grant) through the switch. In addition, a flush timer may be provided that periodically issues a flush timer signal, upon which requests may be generated.

While the central scheduler may track credits for all VOQs for all input port modules, each input port module may simultaneously track credits for its local VOQs.

According to another embodiment of the present invention, a switching system includes plural input port modules for receiving cells, output port modules for transmitting cells, and a central scheduler. Each input port module includes class-specific virtual output queues (VOQs) within sets of VOQs, a request generator, and an arbiter. Each VOQ set is associated with an output port module and class, and each VOQ accumulates credits according to a minimum guaranteed bandwidth associated with that queue (class and destination). The request generator generates high-priority requests for transfer upon the receipt of cells at VOQs having credits, and generates low-priority requests for transfer upon the receipt of cells at VOQs not having credits. The arbitrator, upon receiving a class-independent grant at a VOQ set from the central scheduler, arbitrates transfer of a cell from the VOQ set, giving higher priority to VOQs having credits. The switch fabric directs cells from the input port modules to the output port modules. A central scheduler, responsive to requests for transmission across the switch fabric from the input port modules, issues grants to the requesting input port modules, without regard to class, and is responsive to high-priority requests over low-priority requests.

In yet another embodiment, a method for scheduling transmission of cells through a switch includes, in each input port, maintaining plural virtual output queues (VOQs) where each VOQ being associated with an output port and a class. A minimum guaranteed bandwidth (MGB) is associated with each VOQ. Credits are maintained and tracked per VOQ responsive to the associated MGB and traffic flow through the VOQ. At each input port and every cell time when a cell is transmitted to a switch, if at least one VOQ has at least one credit and has cells for which requests have not been issued (deferred request), a VOQ having at least one credit is selected, and a high-priority class-independent request is generated designating the output port associated with the selected VOQ. Otherwise, a non-empty VOQ is selected, and a low-priority class-independent request is generated designating the output port associated with the selected VOQ. The generated request is forwarded to a central scheduler. At each input port and every cell time, upon receiving a grant from the central scheduler, a VOQ associated with the grant's designated output port is selected where the selected VOQ has at least one credit. If no VOQ has any credits, a non-empty VOQ is selected. A cell is transmitted from the selected VOQ. At the central scheduler, every cell time, requests are received from the input ports. In response to high-priority requests, class-independent grants are issued. In response to low-priority requests, and based on available bandwidth after issuing grants responsive to high-priority requests, class-independent grants are issued.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
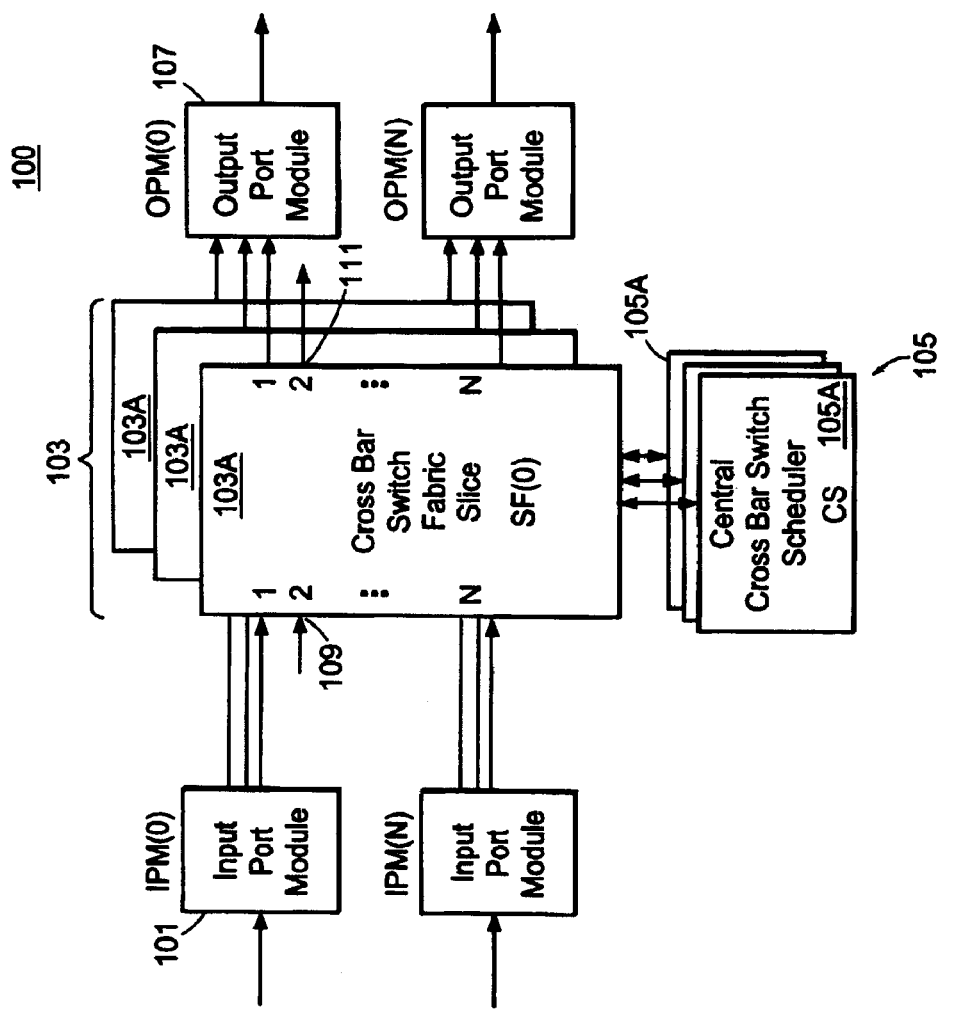
FIG. 1 is a block diagram of an input/output buffered switch of an embodiment of the present invention.

FIG. 1 is a block diagram of an input/output buffered switch 100. Plural input port modules 101 and output port modules 107 are interconnected via a large switch fabric 103. To scale the switch fabric to large number of ports (for example, greater than 100), with each port operating at speeds of several Gigabits/sec each, the most scalable switch fabric is a cross bar switch fabric. The input and output port modules 101, 107 are themselves large shared memory switches.

The cross bar switch fabric 103 has N input ports 109 and N output ports 111. Each input port 109 is attached to an input port module 101 that buffers traffic in large shared memory buffers. Similarly each output port 111 is attached to an output port module 107 that buffers traffic.

To achieve high efficiency and to support QoS, variable length packets may be segmented into fixed length packets, or "cells", in the input port modules. These cells are switched to the output port modules via the cross bar switch. At the output port module, the cells are reassembled into their respective packets.

To increase switching capacity, multiple cross bar switches 103A may be connected in parallel, so that cells from each input module 101 may be distributed across the multiple switch fabric 103 in a load-sharing manner. Associated with each switch fabric slice 103A is a central cross bar scheduler 105A. In the case of multiple parallel switch fabrics 103A, the cross bar schedulers 105A work independently.

Scheduling in such an architecture is performed at three bottleneck locations: the input port module 101, the output port module 107 and the cross bar switch scheduler 105. Class-based scheduling at each input port module 101 is performed to route traffic by class to one of N switch fabric output ports and the associated output port module. Scheduling at each output port module 107 is performed to route traffic by class to the downstream device. These two schedulers address the scheduling requirements that are local to the port modules.

Each cross bar switch fabric slice 103A is controlled by a central scheduler 105A that resolves contention for switch output port bandwidth from competing input port modules 101. The scheduler 105A is a global scheduler and receives reservation requests from all of the switch input port modules 101 for access to switch output ports. Every cell time, each central scheduler 105A arbitrates these requests and issues grants to successful input port modules. Based on results of the arbitration (for the time slot under consideration), the scheduler reconfigures the switch fabric every cell time.

The N×N switch fabric 103 is an electronic cross point switch fabric that can switch fixed size packets. The input port modules 101 receive cells from upstream network processors, and queue then in appropriate virtual output queues. The input port modules 101 also meter the traffic, generate requests for transmission and forward the requests to the central cross bar scheduler.

Some of these requests are classified as high-priority requests to ensure pre-negotiated minimum bandwidth guarantees are met. Other requests are classified as low-priority requests. If multiple parallel switch fabrics are used, a request distributor (not shown) distributes the requests across switch fabrics in a round robin fashion.

In one embodiment, "in-band signaling" is used. Every cell time, each input port module 101 transmits a cell to every switch slice 103A. For example, if there are K switch slices 103A, then every input port module 101 transmits K cells (one to each slice) every cell time. Thus, where there are N input port modules 101, N×K cells are transmitted to the switch 103 every cell time.

Figure 2A:
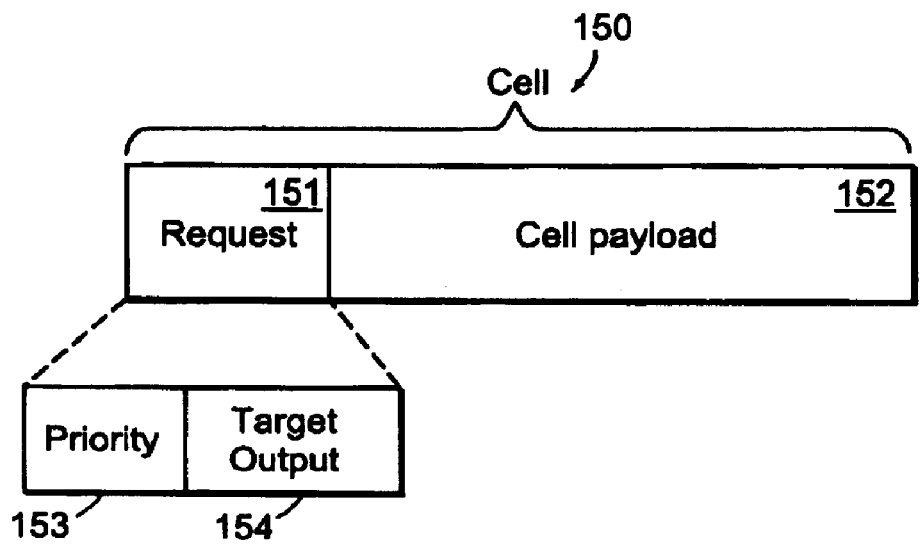
FIG. 2A is a schematic diagram illustrating the structure of an exemplary cell as transmitted from an input port module to the switch in an embodiment of the present invention.

FIG. 2A is a schematic diagram illustrating the structure of an exemplary cell 150 as transmitted from an input port module 101 to the switch 103 in an embodiment of the present invention. The cell 150 consists of two parts: a request 151 and a cell payload 152. Either of these may be either valid or invalid, independently of each other. For example, the cell payload 152 will be valid (real data) or invalid (empty) depending on whether the transmitting input port module 101 has a cell to transmit. Similarly, the request portion 151 may be valid or invalid depending on whether a request has been generated. The request 151 contains an indicator 154 that indicates the target output module or the request (which is independent of the cell's destination), and the priority 153 of the request, but does not indicate the class for which the request may have been transmitted—that is, the request 151 is class-independent.

Figure 2B:
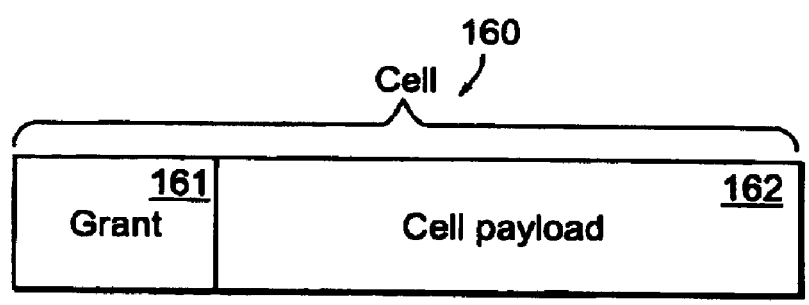
FIG. 2B is a schematic diagram illustrating the exemplary structure of a cell as transmitted from the switch to an input port module in an embodiment of the present invention.

Similarly, every cell time, every switch slice 103A sends a cell bin to every output port module 107. FIG. 2B is a schematic diagram illustrating the exemplary structure of a cell 160 as transmitted from the switch to an input port module in an embodiment of the present invention. Again, the cell 160 consists of two parts: a grant 161 and a cell payload 162, and either of these may be either valid or invalid, independently of each other. The grant 161 is not only class-independent, but is also priority-independent—that is, a grant does not carry information about the priority of the request for which the grant is issued. Each output port module 107 receiving a grant passes on the grant to its associated input port module 101.

Figure 3:
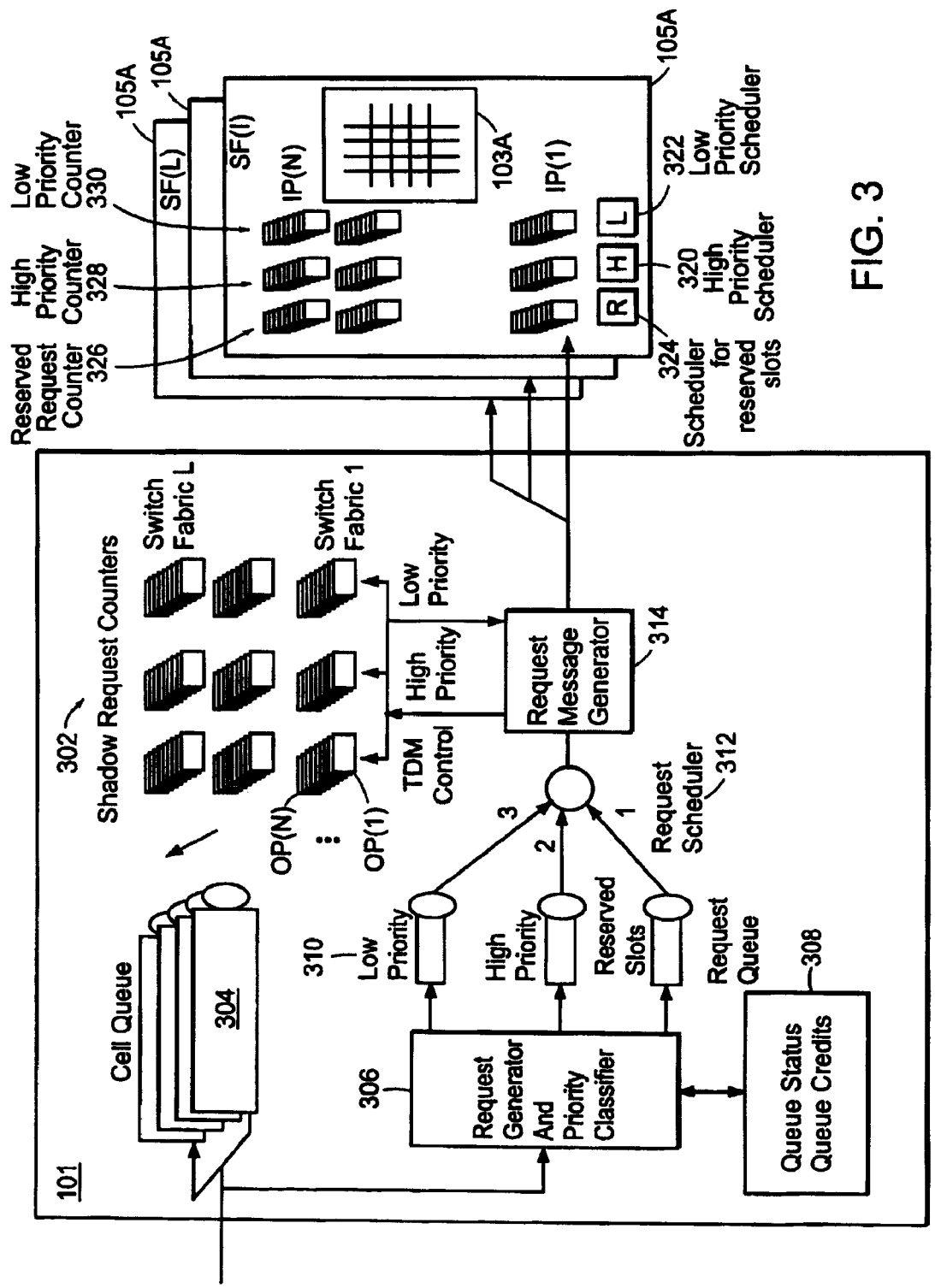
FIG. 3 shows the request generation and distribution mechanism of an embodiment of the present invention.

FIG. 3 shows the request generation and distribution mechanism of an embodiment of the present invention. An input port module 101 has multiple banks of shadow request counters 302, one bank for each switch fabric and each priority. In addition to the high and low-priority request counters, a bank of counters may keep track of requests for time slots that are reserved on a long term basis to support Time Division Multiplexed (TDM) traffic.

Each bank may have N request counters, one for each class-queue 304 in the input port module 101, i.e., corresponding to each of output ports 1 through N. The number of outstanding requests for each queue for each priority and each switch fabric may be limited to a number that will just compensate the central scheduler arbitration delay and the round trip propagation delay.

Upon arrival of a cell at an input port module 101, a request generator and priority classifier 306 generates a request and classifies the request as either a reserved, high-priority or a low-priority request, as described below. The class-independent requests are then queued into corresponding request queues 310. As discussed later, requests may also be generated upon the transmission of a cell through the switch, or at regular "flush" intervals.

A request scheduler 312 selects requests from the request queues 310 and passes them on to the request message generator 314.

For each new request, the request message generator/distributor 314 picks the next switch slice 105A whose request counter is not full, in a around robin fashion. Because each input port module 101 maintains its own shadow copy 302 of the request counters, no communication with the central scheduler is necessary to determine whether a counter is full. The round robin distribution is performed over all requests (i.e., over all priority and all destination addresses). This method of picking the next switch slice ensures that the links connecting the switch input port module with the switch fabrics (which is a bottle neck resource) are evenly loaded.

The input port modules 101 receive grants for transmission from the central scheduler 105 in response to prior requests, select cells from appropriate queues and forward the selected cell to the switch fabric 103.

Every cell time, the central cross bar scheduler 105 receives high and low-priority requests from all of the input port modules for transmission across the switch fabric. A high-priority arbiter 851 (FIG. 8—discussed below) first resolves the contention among high-priority requests using a round robin policy. Following this, a low-priority arbiter 853 (FIG. 8) resolves the contention between low-priority requests using a weighted round robin policy. The scheduler 105 returns grants to the associated input ports whose requests have been successfully resolved. The grants do not contain class or priority information.

Each output port module 107 (FIG. 1) receives cells from the switch fabric 103, queues the cells by class, and serves them using a weighted round robin scheduler.

Figure 4:
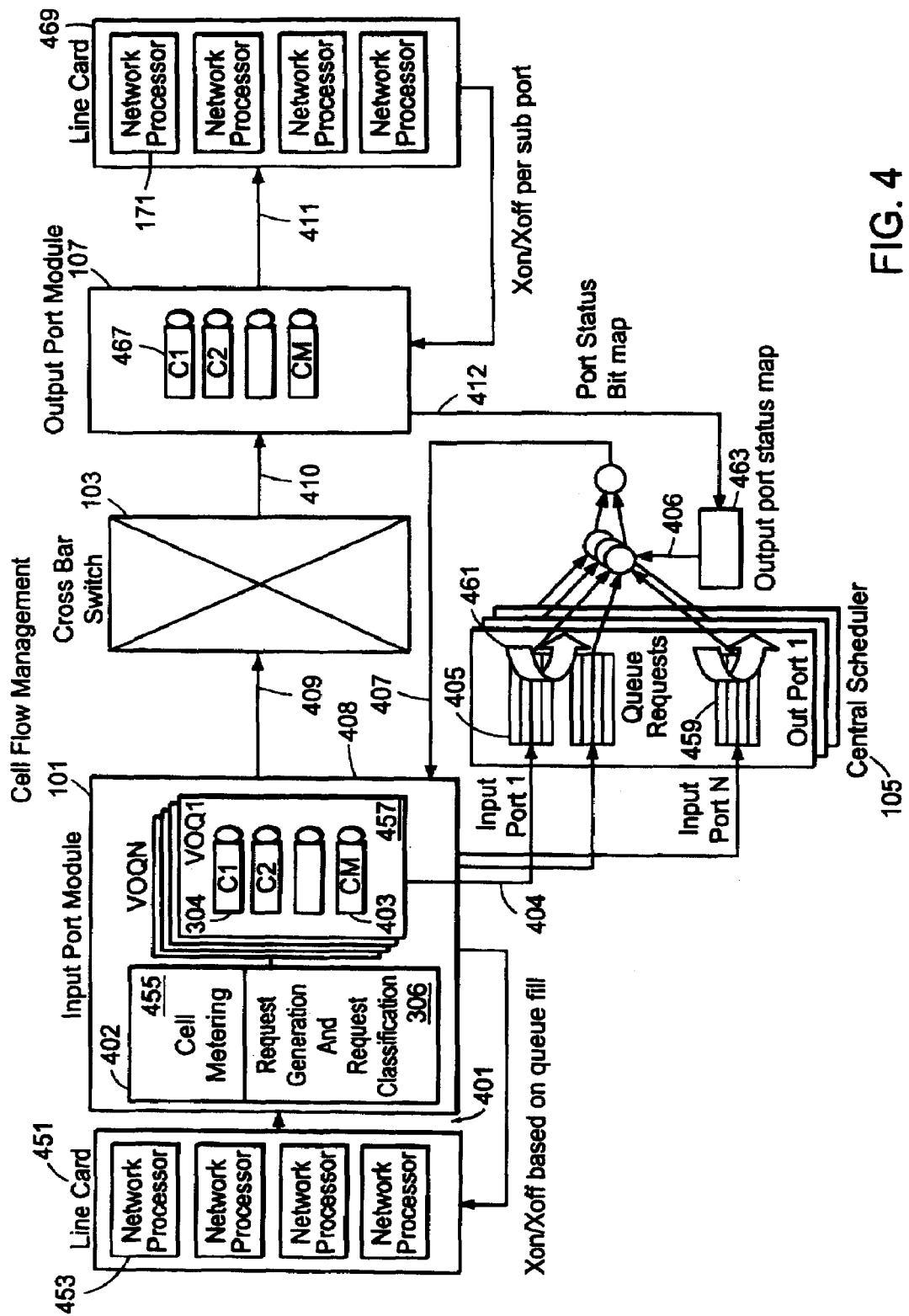
FIG. 4 is a schematic diagram illustrating the flow of cells from an input port module to an output port module.

FIG. 4 is a schematic diagram illustrating the flow of cells from an input port module 101 to an output port module 107.

The input port modules 101 receive cells (step 401) from upstream network processors 453, which may, for example, be physically grouped together on one or more line cards 451.

At 402, the arriving cells are metered, according to minimum bandwidth guarantee parameters for each destination/class, and marked for generating a high-priority request if credits are available, or a low-priority request if not credits are available.

At 403, the cells are queued by destination port and class. Each queue set 457, for example VOQ1, corresponding to output 1, comprises a series of queues for each class C1 through CM (for M classes).

At 404, requests for transmission are forwarded to the central scheduler 105. If there are multiple parallel switch fabrics, the particular scheduler slice 105A may be chosen in a round robin fashion. As was shown in FIG. 2A, the request may contain both destination port address and priority. Note that a request is neither bound to the cell that generated the request nor to the queue in which the cell is queued.

At 405, requests are placed in queues 459 at the central scheduler 105 according to input port, output port and priority (high or low).

At 406, a two-dimensional global scheduler 461 arbitrates the high-priority requests followed by the low-priority requests. Grants are issued for output ports that are ready to receive cells as indicated by the output port status bit map 463.

Based on step 406, at 407 grants for successful requests are forwarded to the associated input port modules 101. A grant carries the output port number to which it applies.

At 408, the input port module 101 allocates a received grant to a valid class queue 304 that has a cell destined for the output port for which the grant has been issued. The policy for allocating the grant to a class queue in the input port module is local to the input port module 101. In one embodiment, any valid class queue that has cells for the output port and that has issued a high-priority request (has credits for transmission) is chosen first. If there is more than one such queue, a round robin or static priority between the class queues may be used to select a queue. If no valid queue has issued a high-priority request (has no credits), then valid class queues with cells (but without credits) may be chosen using the same rule (priority or round robin).

At 409, the selected cell is transmitted through the switch fabric 103 to the target output port module 107. At 410, the cell is received at the output port module 107 and queued by class in an output queue 467. At 411, class queues in the output port module are served in a weighted round robin manner, i.e., cells from selected class-queues are transmitted to the network processors 471 in one or more line cards 469. Note that, although shown as distinct items, line cards 451 and 469 may be a single line card, and that a single network processor may function as both an input processor 453, and an output processor 471.

At 412, every cell time, each output port module informs the central scheduler 105 of the status of its buffers, in one embodiment, in the form of an output port status map 463. The information 463 may consist of, for example, two bits to indicate whether the port can receive both high and low-priority traffic, or high-priority traffic only or no traffic at all. This status information provides a backpressure control to the two schedulers in the central cross bar scheduler.

The minimum bandwidth guarantee is provided by a credit generation mechanism and metering policy. Credits may be generated, for example, by using a token counter where the counter is incremented at the guaranteed minimum bandwidth rate, or by using a virtual clock mechanism.

The virtual clock mechanism is more versatile and is now described. Assume that each input port module operates at an aggregate speed of C Gbps and that cells are B byte in length. The time required to transmit a cell of B bytes at a speed of C Gbps is referred to as a "cell time". For each class, a guaranteed bandwidth of from 0 to C Gbps can be allocated, while the total for all classes cannot exceed C. Nonetheless, it is desirable to allow burst sizes of up to hundreds of (B-byte) cells, although the allowable burstiness should be carefully controlled to maintain acceptable performance.

Conceptual Framework

For exemplary purposes, it is assumed that only a single switch fabric is used. Extension of the concept to multiple parallel switch fabrics is straightforward.

To simplify the following discussion, we now simply identify some queue as queue i. The state of each queue i may be maintained by the following variables:

TRT(i): The next theoretical request generation time for queue i to achieve the desired minimum throughput guarantee.

Occ(i): A count of the current buffer occupancy of queue i.

Treq(i): A count of the total number of requests that have already been issued by queue i (including both high-priority and low-priority requests) to the central scheduler.

Hreq (i): A count of the total number of high-priority requests that have been issued by queue i to the high-priority arbiter in the central scheduler.

LTh: The threshold on the maximum number of outstanding requests Treq(i) (high and low-priority request combined for queue i) above which the issuance of low-priority requests is suppressed.

CT: The current time.

$\Delta(i)$: The target cell inter-arrival time (in so many slots or cell-times) to achieve the desired minimum bandwidth guarantee (i.e., the amount by which to increment TRT(i)).

Dmax(i): The maximum allowed backward drift (lag) of TRT(i) from the current time CT, in order to control traffic burstiness. In particular, Dmax(i)=$\beta$ $\Delta(i)$, which allows a maximum burst of $\beta$ cells to be able to generate high-priority requests back to back. For ease of implementation, the burst size $\beta$ may be restricted to a power of two.

Requests may be generated upon any of three events or epochs: cell arrival, cell departure, and periodic flush.

According to an embodiment of the invention, queue i accumulates a credit once every $\Delta(i)$. In the virtual clock space, for queue i, if the current time CT (the time at which the cell arrives) is equal to or greater than the theoretical request time TRT(i) (i.e., CT>=TRT(i)), then a cell arriving at queue i has a credit available and hence can generate a high-priority request. The theoretical request time TRT(i) may then be advanced, or incremented, by $\Delta(i)$.

If, on the other hand, the cell arrives sooner than TRT(i) (i.e., CT<TRT (i)), then queue i has no credits, and the cell can generate only a low-priority request. In this case, no update of TRT(i) is made. If there are no cell arrivals for some time, the TRT(i) begins to lag behind CT. If this lag is J$\Delta(i)$, then queue i will have accumulated J credits.

If arrivals are bursty, that is, cells arrive at a given queue back to back rapidly, then the arriving cells may exhaust all credits, after which any new arrivals generate low-priority requests that are directed to the low-priority scheduler.

To avoid generating excessive low-priority delays, a delayed request generation mechanism is adopted. If new cell arrivals find credits, then high-priority requests are immediately issued. If an arriving cell does not find a credit, the cell is queued but request generation may be delayed until a credit becomes available.

Thus, additional request generation epochs must be identified. For example, a cell departure epoch as well as a periodic request flush may be used to generate requests that have been deferred.

While it is necessary to hold back requests to maximize the generation of high-priority requests and thus maintain minimum bandwidth guarantees, it is also necessary to maintain a minimum number of outstanding requests at all times for the following reason. Let Dsch be the scheduling latency in the central scheduler. This includes the minimum time required to schedule a request and generate a grant, as well as the round trip propagation delay between the line cards and the switch cards, which can be several cell times. If C is the bandwidth of the link, then in order to keep the pipe full, and achieve 100% utilization of the link bandwidth, the number of outstanding requests must be equal to the bandwidth delay product LTh=C Dsch.

The operation of the credit management algorithm for an embodiment of the present invention is as follows for each of the following four critical time epochs:

I. Initialization (Call Setup):

First, a value $\beta$ is selected to accommodate the desired burstiness. Next, $\Delta(i)$ is set to C/MGB(i) where C is the bandwidth of the link and MGB(i) is the minimum guaranteed bandwidth in Gbps. Then, $Dmax(i)=\beta \Delta(i)$ is determined.

Next, TRT(i) is set to CT, so that a call becomes eligible to transmit its first cell at the setup epoch. Alternatively, for example, by setting TRT(i)=CT−Dmax(i), the call becomes eligible to seek prioritized transmission for one full burst of cells immediately upon setup.

Finally, the number of requests is initialized to zero, i.e., Treq(i) and Hreq(i) are both set to zero.

Figure 5A:
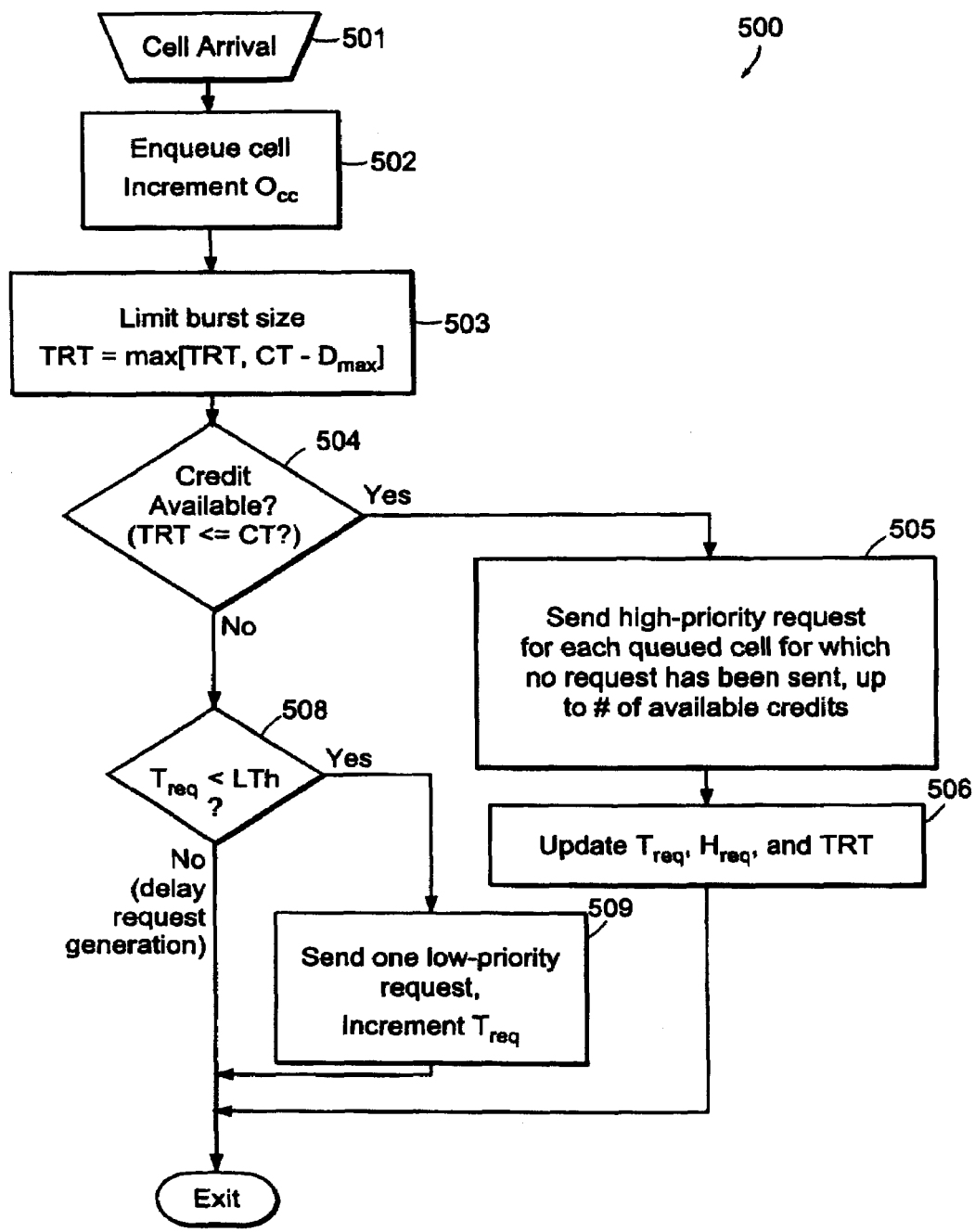
FIGS. 5A and 5B are respectively, a flowchart and schematic diagram illustrating the generation of a request for transmission upon arrival of a cell at the input port module.
Figure 5B:
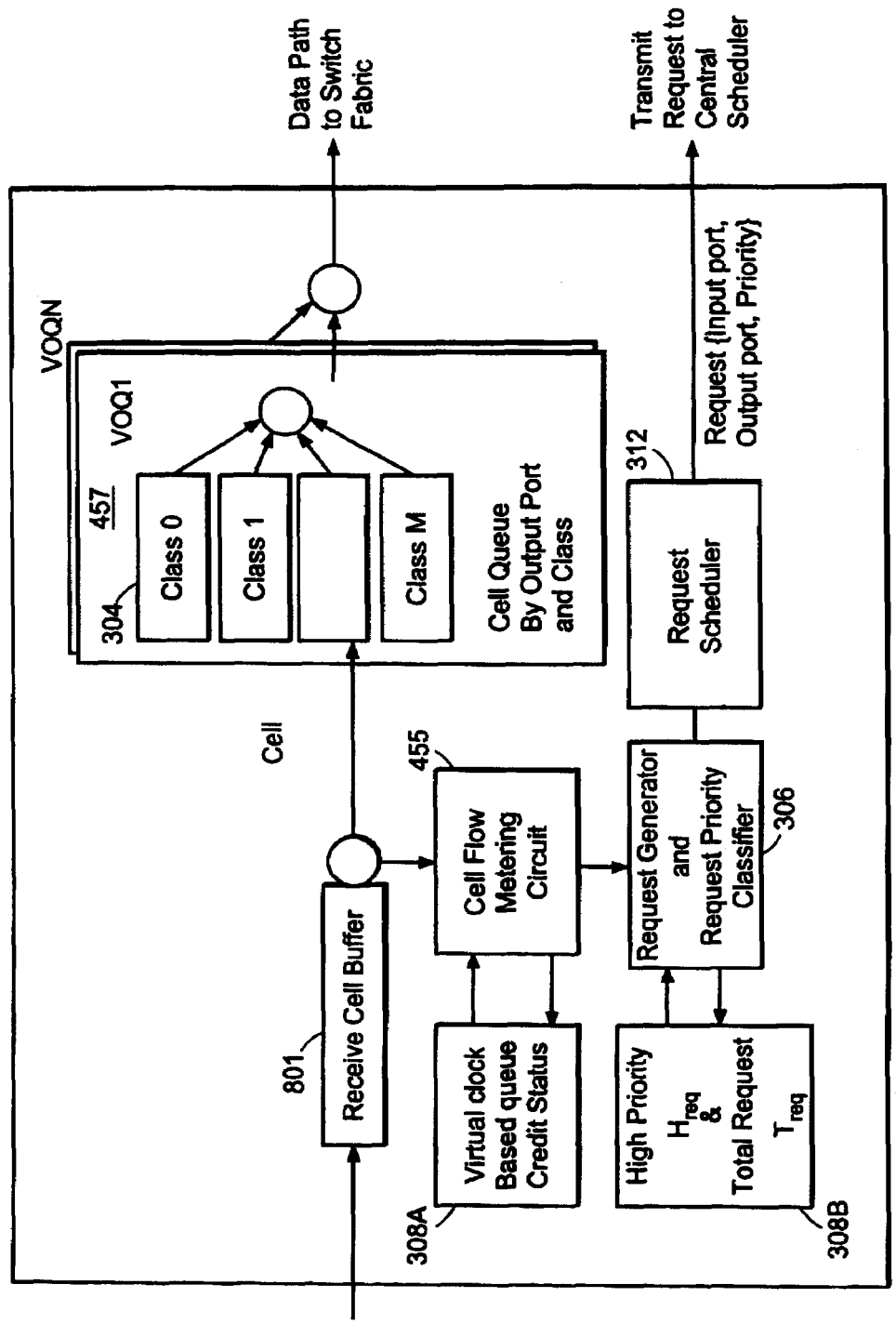

II. Cell Arrival at Queue i:

FIGS. 5A and 5B are respectively, a flowchart 500 and schematic diagram illustrating the generation of a request for transmission upon arrival of a cell 501 at the input port module.

Referring first to FIG. 5A, in step 502, the arriving cell is enqueued in the appropriate queue i. The occupancy of queue i, i.e., the total count of cells in queue i waiting for service, or Occ(i), is incremented.

At step 503, TRT(i) is adjusted to limit burst size. That is, TRT(i) is limited to be at least CT−Dmax, thus limiting the number of unused credits.

If credits are available, that is, if TRT≦CT, as determined at step 504, then at step 505, numreq requests are transmitted, where $numreq=min [Ncr(i), Nreq(i)]$ and where $Ncr(i)=[CT-TRT(i)]/\Delta(i)$; and $Nreq(i)=Max[0, Occ(i)-Treq(i)]$.

That is, a high priority request is transmitted for each cell in queue i for which no request has already been generated (for example, because no credits were available at the time such a cell arrived), up to the number of available credits.

Next, at step 506, both Hreq(i) and Treq(i) are updated—each is incremented by the number of requests just generated and transmitted, i.e., numreq. Also, TRT(i) is incremented by an amount $\Delta(i)$ for each transmitted request, i.e., by numreq×$\Delta(i)$.

If, at step 504, it was determined that no credits are available, then at step 508, it is determined whether the total number of requests Treq(i) issued is less than threshold LTh. If so, then at step 509, a low-priority request is issued, and Treq(i) is updated accordingly, i.e., incremented. Otherwise, request generation is delayed.

Referring now to FIG. 5B, a cell arriving from an upstream device such as a network processor is received into the receive cell buffer 801, where it is processed, and its destination port and class identified. The cell arrival time (that is, the current time CT) is compared with its theoretical request generation time (TRT) in the cell flow metering circuit 455 (FIG. 5A, step 504). Metering parameters are obtained from the queue credit status block 308A.

If the current time (CT) is greater than the TRT, a high-priority requests are generated (step 505) by the request generator and classifier 807. The total request counter Treq, the high-priority request counter Hreq 809, and TRT (not shown) are updated (step 506).

If, on the other hand, CT is less than TRT, then a low-priority request is issued if the total number of outstanding requests Treq is less than a threshold LTh (steps 508 and 509). The total request counter Treq (but not Hreq) is incremented in this case.

Requests are forwarded to the central cross bar scheduler 105 (FIG. 1). The cell is queued in the appropriate virtual output queue 813. If neither a high nor a low-priority request can be issued at this time, the request generation is deferred to a later time.

III. Grant Binding at Queue i

Figure 6A:
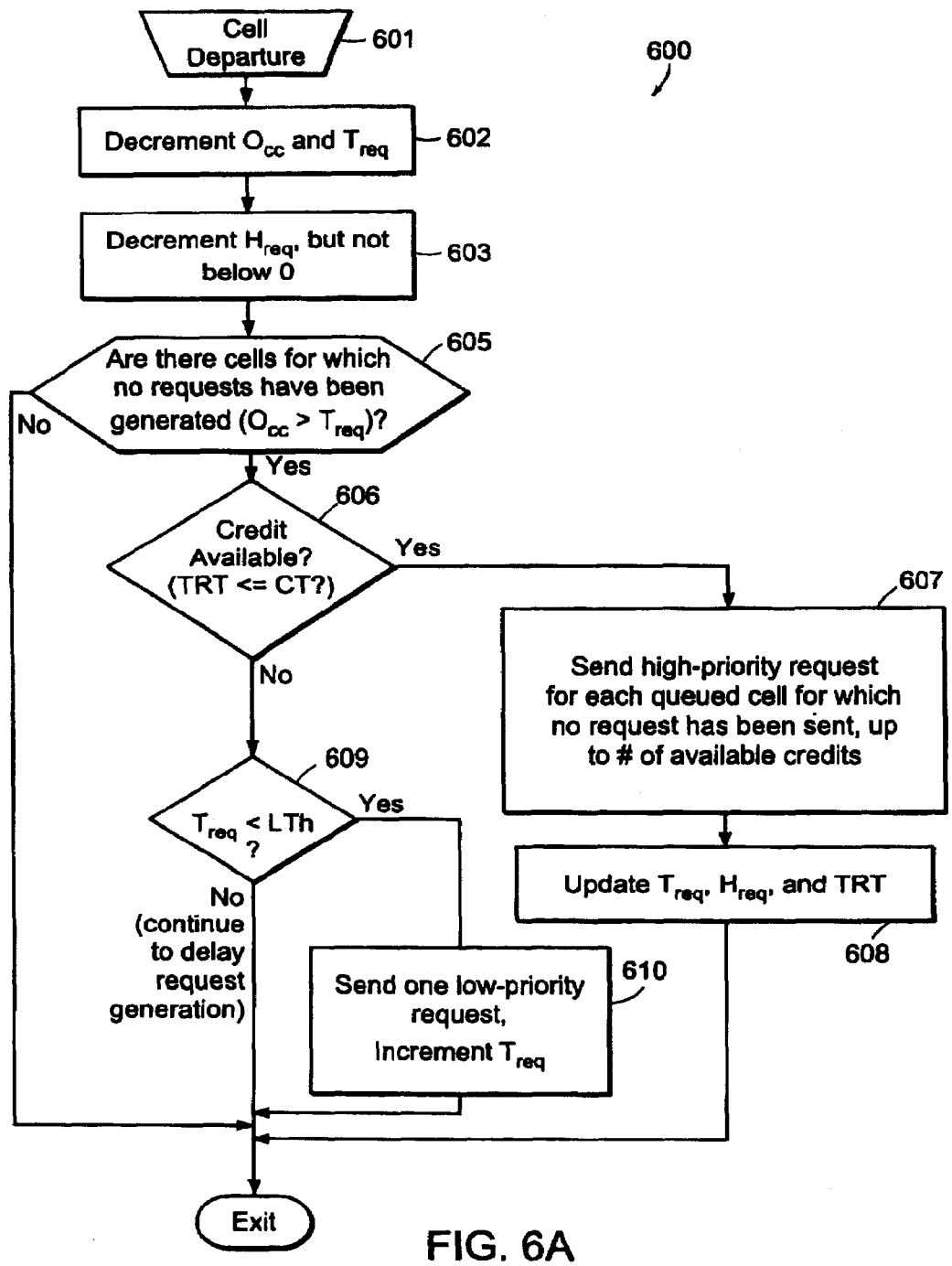
FIGS. 6A and 6B are respectively, a flowchart and schematic diagram illustrating delayed request generation on grant arrival.
Figure 6B:
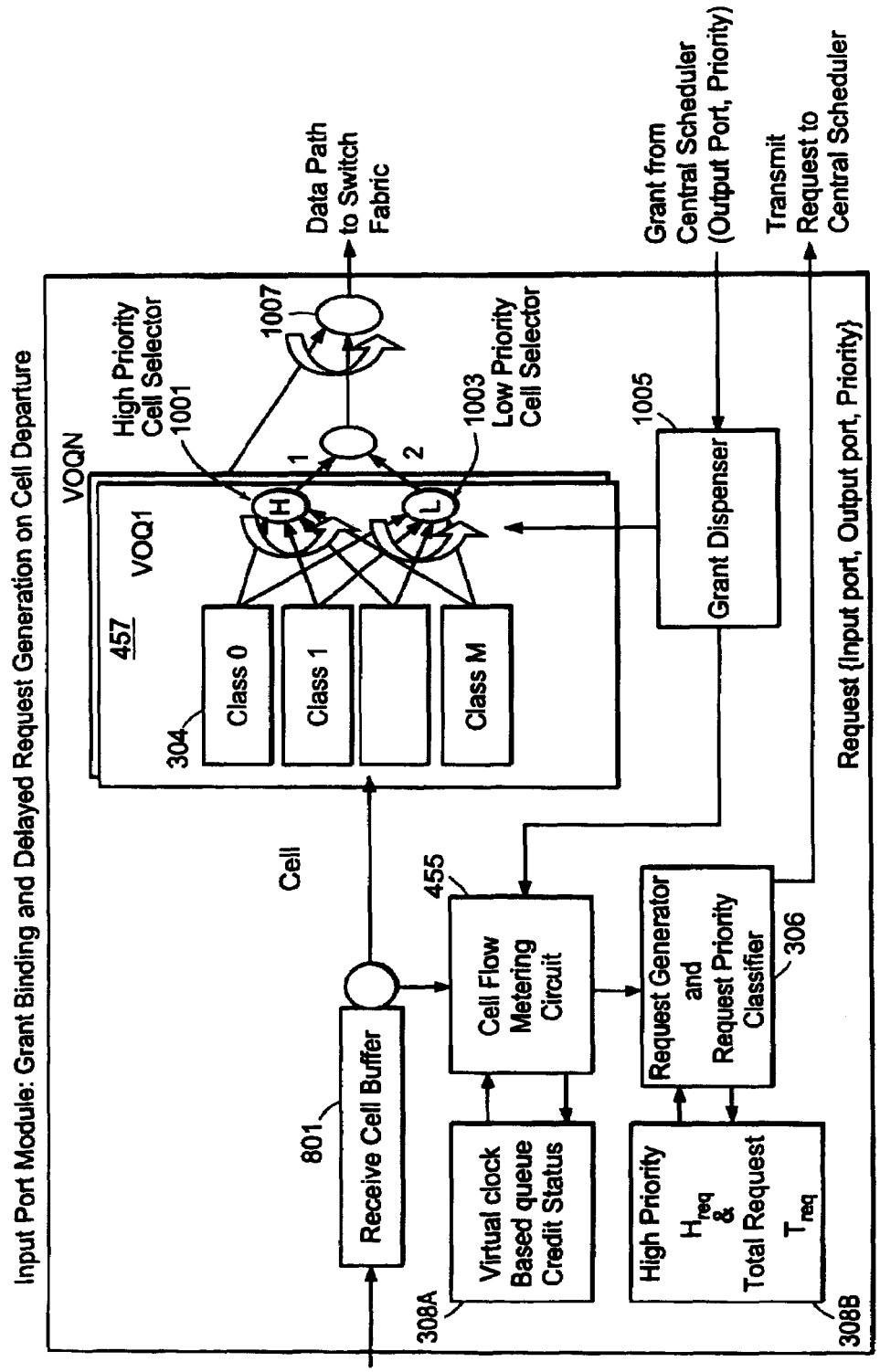

FIGS. 6A and 6B are respectively, a flowchart 600 and schematic diagram illustrating delayed request generation on grant arrival. The grant is preferably assigned to a valid queue i that has issued a high-priority request (i.e., that has credits). If there are no queues with credits, the grant may be assigned to a queue i without credits.

First, at step 601, queue i is serviced, i.e., a cell from queue i is transmitted across the switch fabric. The queue occupancy, Occ(i), and the total number of requests, Treq(i), are then both decremented to reflect that the cell has been transmitted (step 602). At step 603, the number of high-priority requests Hreq(i) is decremented by one, but not below zero.

Step 605 determines whether cells are waiting to issue requests (occupancy of queue(i) is greater than the total number of outstanding requests for queue(i)) and step 606 determines whether credits are available. If both of these conditions are true, then at step 607, as many high-priority requests as permissible may be issued, similarly to step 505 of FIG. 5A. Treq, Hreq and TRT are then updated in step 608.

On the other hand, if there are cells waiting to issue requests but no credits are available, then step 609 determines whether Treq<LTh. If so, then step 610 issues a low-priority request, and Treq is incremented (Hreq and TRT, however, are not incremented). Otherwise, generation of requests continues to be delayed.

FIG. 6B illustrates many of the same components as FIG. 5B, with the addition of two local cell allocators or selectors 1001, 1003, the grant dispenser 1005 and the output port selector 1007. While all of the components shown in both diagrams would ordinarily be present, only those components pertinent to the discussion at hand are shown.

The two local grant allocators 1001, 1003 allocate grants and select cells for transmission. A grant is assigned by the high-priority allocator (H) 1001 to a valid class queue that has at least one outstanding high-priority request. This is determined by checking the value of Hreq(i) for each of the valid class queue i with cells. A valid class queue is a queue whose cells are queued to the destination to which the grant belongs. Any valid class queue having an Hreq(i)>0 is deemed to have an available credit. Valid queues may be checked in round robin manner or in some statically ordered way.

If no valid queue has an available credit, i.e., Hreq(i)=0 for every valid queue, then a valid queue with a cell (i.e., a queue having Treq(i)>0 and Hreq(i)=0) is selected by the low-priority arbiter (L) 1003 in a round robin or static priority order for transmission.

The selected cell is forwarded to the switch fabric (step 601 of FIG. 6A), and the occupancy count Occ(i) and total number of requests Treq(i) are each decremented (step 602). If there are any outstanding high-priority requests, i.e., Hreq(i)>0, then Hreq(i) is decremented by one (step 603). That is, it is assumed that a high-priority request, if one is pending, is now being serviced.

Each cell departure provides an opportunity for generating a request for the class-queue set 457 that was served. If the selected queue has cells that have not yet issued a request (determined at step 605), and if the queue has available credits, i.e., if TRT(i)<CT for that queue (determined at step 606), then high-priority requests may be issued (step 607), and TRT(i), Treq(i) and Hreq(i) are updated (step 608). If TRT(i)>CT and Treq(i)<LTh (step 609), then a low-priority request may be issued and the total number of requests Treq(i) is incremented (step 610).

IV. Periodic Request Flush

Figure 7A:
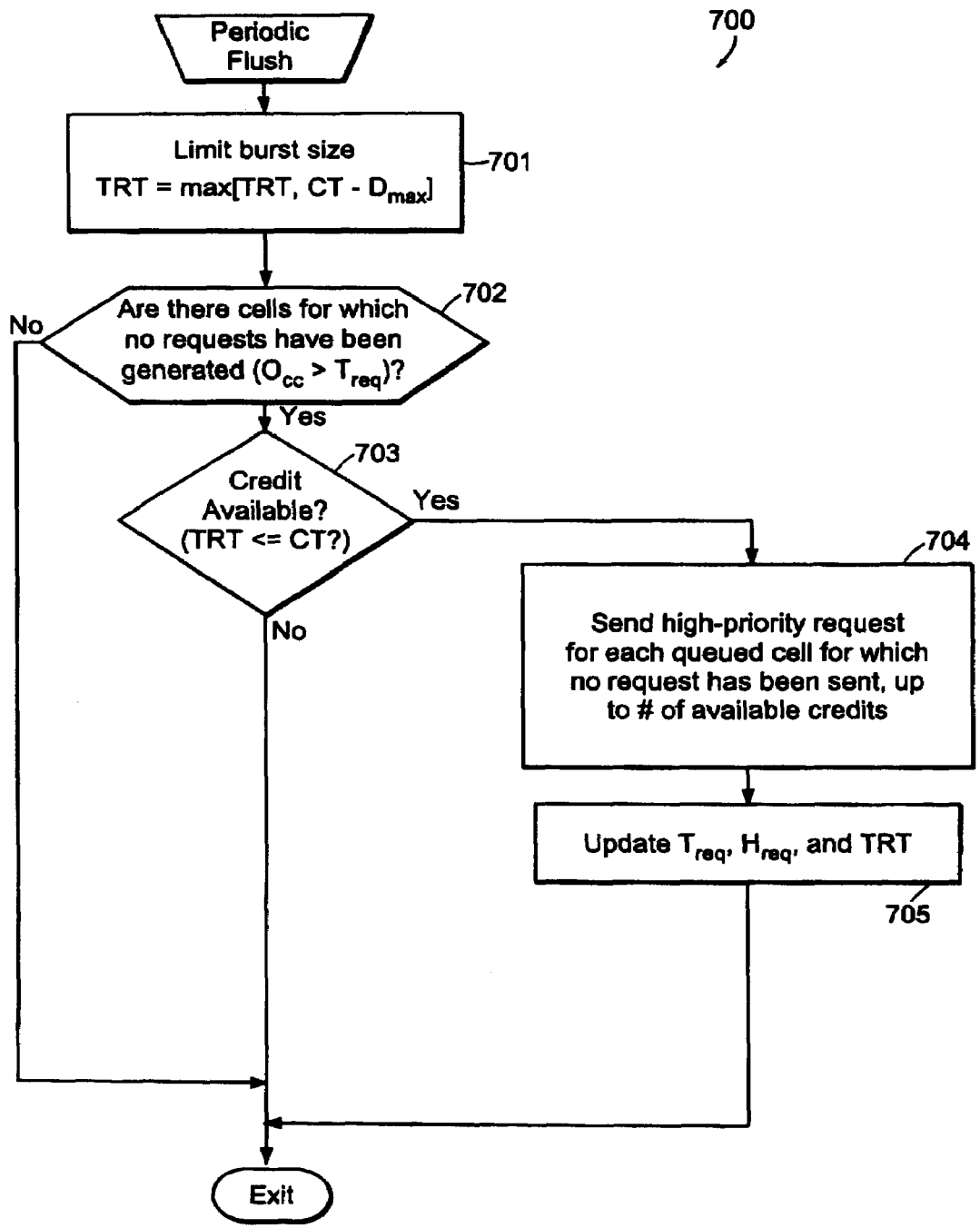
FIGS. 7A and 7B are respectively, a flowchart and schematic diagram illustrating periodic request flush.
Figure 7B:
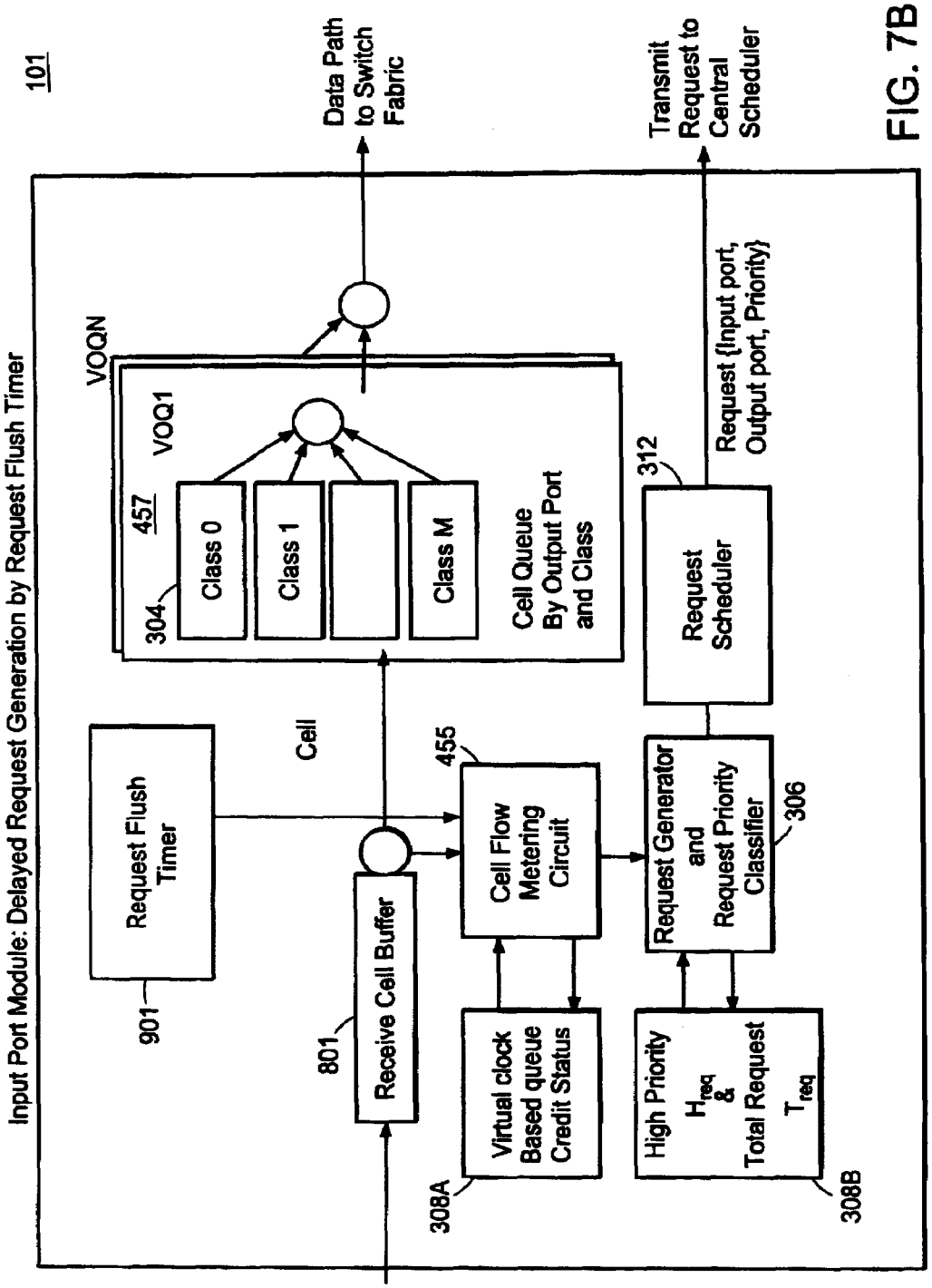

FIGS. 7A and 7B are respectively, a flowchart 700 and schematic diagram illustrating periodic request flush. Since there is no control as to when cells may arrive, a scrubbing process is necessary to ensure that TRT(i) does not lag too far behind current time CT. Wrap-around correction is needed due to the finiteness of bits representing TRT(i) and CT. This also provides an opportunity to flush requests that have been held back.

First, at step 701, TRT(i) is adjusted so that the number of unused credits (burstiness) is limited to Dmax.

Step 702 determines whether cells are waiting to issue requests (occupancy of queue(i) is greater than the total number of outstanding requests for queue(i)) and step 703 determines whether credits are available. If both of these conditions are true, then at step 704, as many high-priority requests as permissible may be issued, similarly to step 505 of FIG. 5A. Treq, Hreq and TRT are then updated in step 705.

Note that the periodic flush only generates high-priority requests.

FIG. 7B is similar to FIG. 6B, with the addition of the request flush timer 901.

The request flush timer 901 "visits" one virtual output queue after another sequentially. On visiting a particular queue, if there are any cells for which a request has not been generated, and if the queue has accumulated credits that have not been availed of by new cell arrivals, then delayed high-priority requests are generated.

The number of such requests generated may be equal to the minimum of the number of deferred requests and the number of unused credits. The number of unused credits is determined by comparing the TRT(i) and the CT. Once these additional requests are generated, the TRT(i) and the high-priority request count Hreq(i) and the total request count Treq(i) are updated.

Central Switch Scheduler

Figure 8:
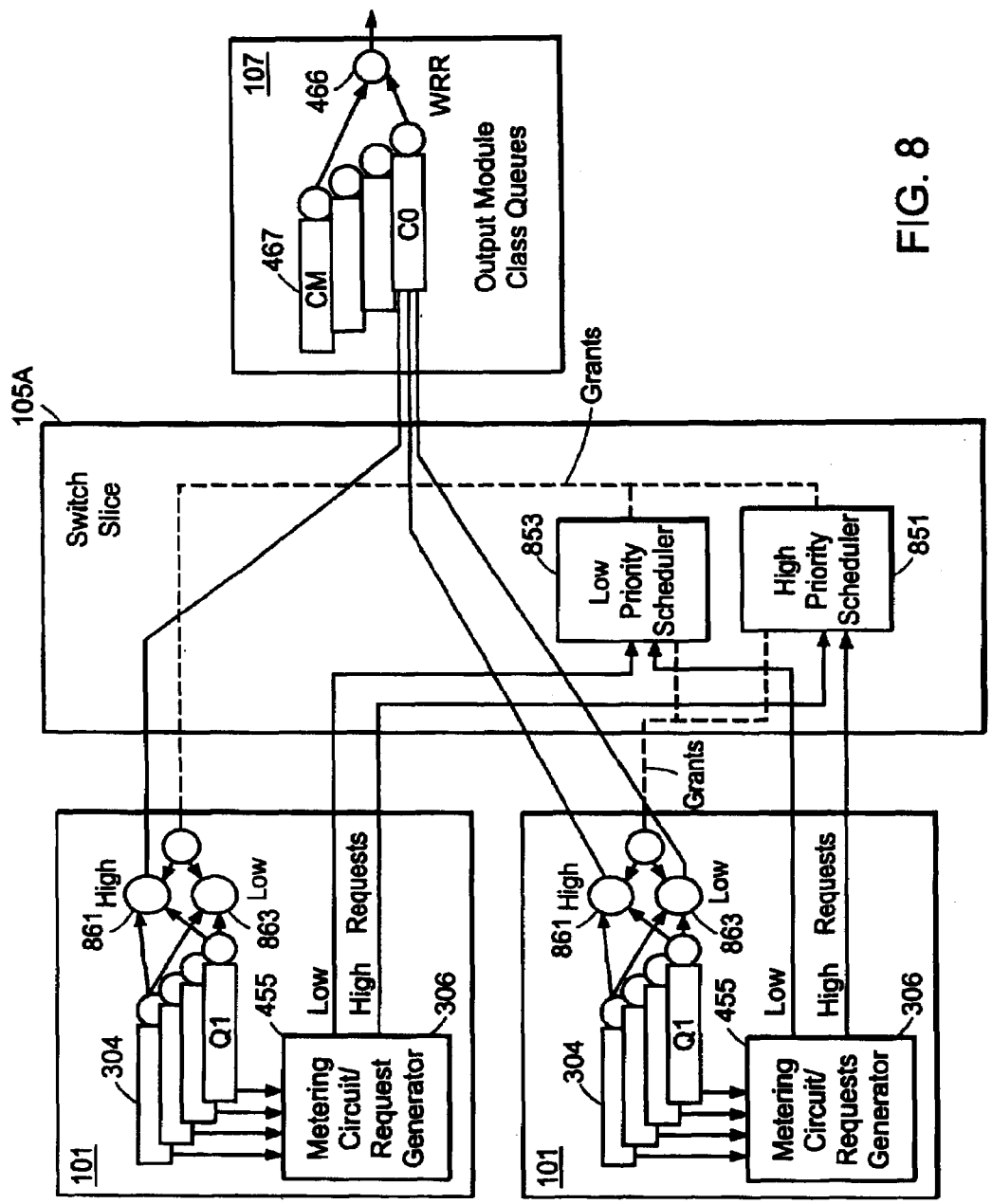
FIG. 8 is a block diagram illustrating the transmission of requests from the input port modules to the respective arbiters in a central scheduler slice, and the return of grants by the central scheduler to the respective input port modules 101.

FIG. 8 is a block diagram illustrating the transmission of requests from the input port modules 101 to the respective arbiters 851, 853 in a central scheduler slice 105A, and the return of grants by the central scheduler 105A to the respective input port modules 101.

The central scheduler 105A receives requests for transmission from the different input ports for transmission to output ports. When there is contention between multiple requests, the scheduler arbitrates in a fair and efficient manner. Since each switch slice is basically an N×N switch, the scheduler matches the N requests with N possible outputs, with no input receiving more than one grant in each cell time from any scheduler slice, and no output being scheduled to receive more than one cell from any scheduler slice in each cell time. A maximal matching iterative algorithm is used to resolve the contention.

In one embodiment of the invention, the scheduler 105 employs a 3-phase arbitration is used.

In the first phase, any reserved time slots (e.g., TDM service) are taken out of contention if there are requests from the respective input switch ports that reserved them. Each input switch interface queue, has a bit map of the reserved time slots to generate their requests at the appropriate time.

In the second phase, high-priority requests from all of the input port modules are served, i.e., grants are issued in response to the high-priority requests, to meet minimum throughput guarantees. A global round robin arbitration policy may be used to resolve contention.

In the third and last phase, low-priority requests from all input port modules are processed, to take advantage of the unused bandwidth at the output ports. Unused bandwidth is that bandwidth that is left over after minimum guarantees are met.

This final phase arbitration for sharing of unused bandwidth may use, for example, a weighted round robin (WRR) mechanism to pick winners. This provides weighted fair share of unused bandwidth at the output port to contending input ports. The system controller sets the weights independently. Each phase may involve multiple iterations for efficiency. Thus the scheduler may be pipelined over several time slots.

Figure 9:
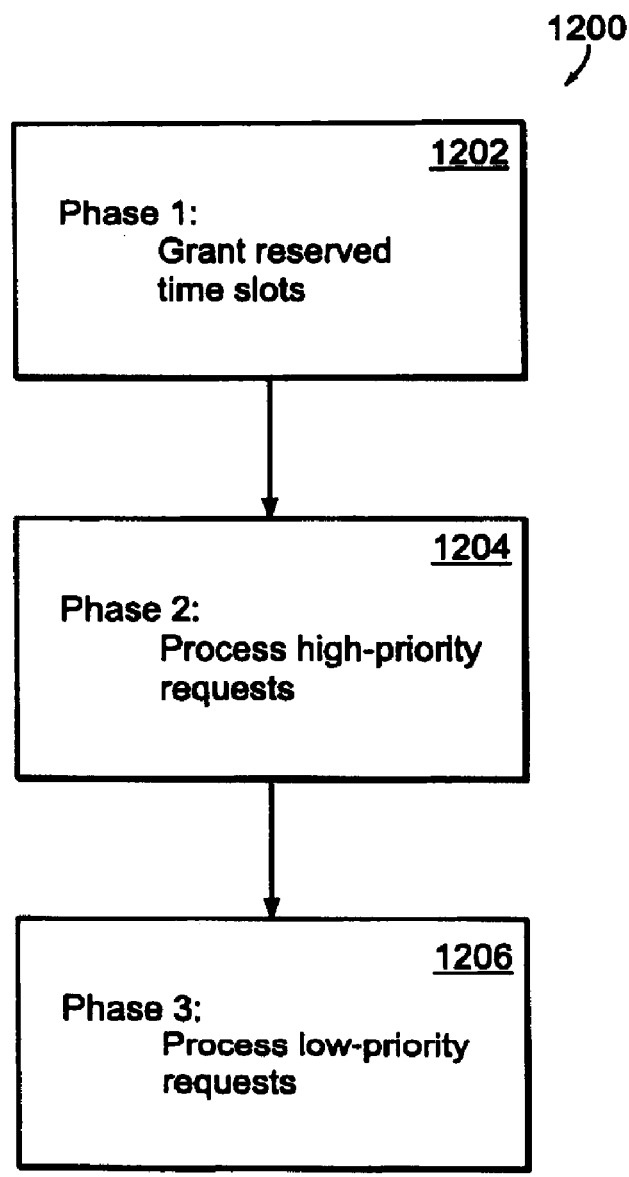
FIG. 9 is a flowchart, illustrating at a high level, the central scheduler operation.

FIG. 9 is a flowchart 1200, illustrating at a high level, the central scheduler operation.

Phase 1 Arbitration: Reserved Time Slots

In phase 1 (1202), if the time slot in question is reserved between specific input-output port pair and there is a request from the input ports that made the reservation, the time slot is immediately granted and the input output pair is removed from further contention for this time slot. Bit maps of these slots are maintained in the associated input ports. Thus, each input port knows a priori which reserved time slots it is entitled to.

Reserved time slots are generally used to transport TDM traffic. A frame time of Ntdm cells is assumed so the reservations can be repeated frame after frame. The value of Ntdm is set by the minimum TDM rate that must be supported.

Phase 2 Arbitration—High-Priority Requests

In phase 2 (1204), high-priority requests are processed to ensure guaranteed minimum bandwidth between input output port pairs for each class is met. The arbitration involves matching the requests from N inputs with the N outputs, and maximizes the throughput without sacrificing fairness. A round robin maximal matching algorithm performs the matching. Since the bandwidth reserved to meet minimum bandwidth guarantees will always be less than the bottleneck bandwidth, the high-priority arbiter using a round robin scheduling resolves all contention with minimum latency.

At the end of phase 2, all high-priority requests have been serviced.

Phase 3 Arbitration—Weighted Fair Share Arbitration for Low-Priority Requests

In phase 3 (1206), low-priority requests (and any remaining high-priority requests) contend for the remaining free output ports. The time duration for which an output port is free is a measure of the unused bandwidth at the port, where unused bandwidth is defined as the remaining bandwidth after the requirements of the guaranteed share has been met.

The unused bandwidth can be shared between unicast classes in a weighted fair share manner. Since this introduces additional complexity, in one embodiment of the invention, the unused bandwidth at each output port is shared only between contending input ports, in a weighted fair share manner.

The fair share scheduler may be, for example, a weighted round robin (WRR) scheduler. The phase 3 arbiter 1206 is similar to the phase 2 arbiter 1204, except that the phase 3 arbiter 1206 may implement a different policy. For example, the phase 3 arbiter may implement a WRR policy, rather than a round robin policy for selecting the input request queues. Each input/output port pair associated with a request is associated with a weight which may be based on available credits. For example, input/output port pairs with credits can have priority over ports without credits. Each time an input/output port pair is granted service, the available credit is decremented. The credits are periodically replenished.

As illustrated, the output module 107 may schedule transmission of queued cells according to a weighted round robin schedule 466.

While this invention has been particularly shown and described with references to preferred embodiments thereof, it will be understood by those skilled in the art that various changes in form and details may be made therein without departing from the scope of the invention encompassed by the appended claims. For example, as circuitry speeds continue to increase, the capabilities of the central scheduler may increase, and it may be possible to map classes to many different levels of priority, rather than just high and low.

What is claimed is:

1. A method of transferring data cells of plural classes from input ports to output ports through a switch, comprising:
   storing cells at each input port in class-specific virtual output queues (VOQ) within sets of VOQs associated with output ports;
   providing credits to VOQs according to class-associated guaranteed bandwidths, wherein respective credits for each VOQ are determined based upon an amount of lag between a next theoretical request time of each VOQ and a time at which a cell is received for each VOQ;
   upon receipt of cells at VOQs having credits, generating high-priority requests for transfer;
   upon receipt of cells at VOQs not having credits, generating low-priority requests for transfer;
   in response to requests, issuing grants to VOQ sets without regard to class, grants being issued in response to high-priority requests over low-priority requests; and
   at a VOQ set, upon receiving a grant for said VOQ set, arbitrating transfer of a cell, giving higher priority to VOQs having credits.

2. The method of claim 1, further comprising:
   forwarding generated requests from all input ports to a central scheduler in a switch fabric slice, the central scheduler issuing the grants.

3. The method of claim 2, the switch fabric comprising multiple slices and associated central scheduler.

4. The method of claim 3, further comprising:
   distributing requests across the switch fabric slices in parallel.

5. The method of claim 4, wherein the requests are distributed across the switch fabric slices in a fixed order.

6. The method of claim 3, wherein every cell time, each input port sends a cell to every central scheduler slice, the cell comprising a request and a cell payload, the request being valid or invalid, the cell a payload being valid or empty.

7. The method of claim 6, wherein a valid request comprises a reference to a target output of the request and a request priority.

8. The method of claim 1, further comprising:
   delaying generation of low-priority requests and instead generating high-priority requests when credits become available.

9. The method of claim 8, wherein generation of low-priority requests for a class queue are delayed when the number of outstanding requests for the class queue exceeds a predetermined threshold.

10. The method of claim 8, further comprising:
    generating requests upon arrivals of cells.

11. The method of claim 8, further comprising:
    generating requests upon transmissions of cells.

12. The method of claim 8, further comprising:
    generating requests upon a periodic flush timer signal.

13. The method of claim 1, further comprising:
    granting low priority requests at the central scheduler according to weighted fair share policy.

14. The method of claim 1, further comprising:
    at the central scheduler, tracking credits for all VOQs for all input port modules; and
    simultaneously, at each input port module, tracking credits for its local VOQs.

15. The method of claim 1, wherein credits are maintained using a virtual clock-based credit generation mechanism.

16. A switching system, comprising:
    plural input port modules for receiving cells, each input port module comprising
      class-specific virtual output queues (VOQs) within sets of VOQs, each set associated with an output port module, the VOQs accumulating credits according to class-associated guaranteed bandwidths, wherein respective credits for each VOQ are determined based upon an amount of lag between a next theoretical request time of each VOQ and a time at which a cell is received for each VOQ,
      a request generator which generates high-priority requests for transfer upon receipt of cells at VOQs having credits, and which generates low-priority requests for transfer upon receipt of cells at VOQs not having credits, and
      an arbitrator which, upon receiving a class-independent grant at a VOQ set, arbitrates transfer of a cell from the VOQ set, giving higher priority to VOQs having credits;
    said output port modules for transmitting cells;
    a switch fabric which directs cells from the input port modules to the output port modules; and
    a central scheduler associated with each switch fabric slice, which, responsive to requests for transmission across the switch fabric from the input port modules, issues grants to the requesting input port modules, without regard to class, the central scheduler issuing grants in response to high-priority requests over low-priority requests.

17. The system of claim 16, further comprising:
    a central scheduler which issues the grants in response to requests generated from all input ports to the central scheduler issuing the grants.

18. The system of claim 17, wherein the switch comprises multiple switch fabric slices and associated central scheduler.

19. The system of claim 18, wherein requests are distributed across the switch fabric slices in parallel.

20. The system of claim 19, wherein the requests are distributed across the switch fabric slices in a fixed order.

21. The system of claim 18, wherein, every cell time, each input port sends a cell to every central scheduler slice, the cell comprising a request and a cell payload, the request being valid or invalid, the cell payload being valid or empty.

22. The system of claim 21, wherein a valid request comprises a reference to a target output of the request and a request priority.

23. The system of claim 16, wherein generation of low-priority requests is delayed and instead high-priority requests are generated when credits become available.

24. The system of claim 23, wherein generation of low-priority requests for a class queue are delayed when a number of outstanding requests for the class queue exceeds a predetermined threshold.

25. The system of claim 23, wherein requests are generated upon arrivals of cells.

26. The system of claim 23, wherein requests are generated upon transmissions of cells.

27. The system of claim 23, wherein requests are generated upon a periodic flush timer signal.

28. The system of claim 16, wherein the central scheduler issues grants in response to low-priority requests according to weighted fair share policy.

29. The system of claim 16, wherein the central scheduler tracks credits for all VOQs for all input port modules, and simultaneously, each input port module tracks credits for its local VOQs.

30. The system of claim 16, further comprising:
a virtual clock-based credit generation mechanism to maintain credits.

31. A system for transferring data cells of plural classes from input ports to output ports through a switch, comprising:
means for storing cells at each input port in class-specific virtual output queues (VOQ) within sets of VOQs associated with output ports;
means for providing credits to VOQs according to class-associated guaranteed bandwidths, wherein respective credits for each VOQ are determined based upon an amount of lag between a next theoretical request time of each VOQ and a time at which a cell is received for each VOQ;
means for generating high-priority requests for transfer, upon receipt of cells at VOQs having credits;
means for generating low-priority requests for transfer, upon receipt of cells at VOQs not having credits;
means for issuing grants, in response to requests, to VOQ sets without regard to class, grants being issued in response to high-priority requests over low-priority requests; and
means for arbitrating, at a VOQ set, upon receiving a grant for said VOQ set, transfer of a cell, giving higher priority to VOQs having credits.

32. A method for scheduling transmission of cells through a switch, the switch having plural input ports, plural output ports, and at least one switching fabric slice, each cell arriving at an input port and designating an output port, and each cell having an associated class, the method comprising:
in each input port, maintaining plural virtual output queues (VOQs), each VOQ being associated with an output port and a class;
associating a minimum guaranteed bandwidth (MGB) with each VOQ;
maintaining and tracking credits per VOQ responsive to the associated MGB and traffic flow through the VOQ, wherein respective credits for each VOQ are determined based upon an amount of lag between a next theoretical request time of each VOQ and a time at which a cell is received for each VOQ;

at each input port and every cell time:
if at least one VOQ has at least one credit, selecting a VOQ having at least one credit, and generating a high-priority class-independent request designating the output port associated with the selected VOQ, and
otherwise, selecting a non-empty VOQ, and generating a low-priority class-independent request designating the output port associated with the selected VOQ, and
forwarding the generated request to a central scheduler;
at each input port and every cell time:
upon receiving a grant from the central scheduler, selecting a VOQ associated with the grant's designated output port, the selected VOQ having at least one credit, and if all VOQs have zero credits, the selected VOQ being non-empty, and
transmitting a cell from the selected VOQ; and
at the central scheduler, every cell time:
receiving requests from the input ports,
issuing class-independent grants to input ports, responsive to high-priority requests received from said input ports,
issuing class-independent grants to input ports, responsive to low-priority requests received from said input ports and based on available bandwidth after issuing grants responsive to high-priority requests.

33. A method for scheduling transmission of cells through a switch, the switch having plural input ports, plural output ports, and a switching fabric, each cell arriving at an input port and designating an output port, and each cell having an associated class, the method comprising:
associating a minimum guaranteed bandwidth (MGB) with each input-output-class;
every cell time, generating, at each input port, a request for transmission through the switch fabric, based on queue occupancy and requests previously generated, the request designating the output;
assigning a priority to each generated request based on whether the MGB is currently satisfied for the input-output-class designation associated with the cell, wherein determining whether the MGB is currently satisfied comprises determining an amount of lag between a next theoretical request time for the input-output-class designation and a time at which a cell is received for the input-output-class designation;
forwarding the generated requests to a central scheduler;
issuing grants, at the central scheduler, responsive to high-priority requests received from the input ports, according to a round robin scheduling applied to the input ports, grants being class-independent and designating outputs;
issuing grants, at the central scheduler, responsive to low-priority requests, in a weighted fair-share manner, based on available bandwidth after granting high-priority requests, grants being class-independent and designating outputs; and
upon an input port receiving a grant, allocating the grant to one of the input port's class queues associated with the designated output port and having at least one outstanding high-priority request, and if no such class queue exists, allocating the grant to one of the class queues associated with the designated output port and having at least one outstanding low-priority request.

34. A method for providing multi-class end-to-end quality of service (QoS) in a large-capacity input/output buffered crossbar switch, comprising:

reserving a channel for every input/output pair and every class, each channel having an associated minimum bandwidth guarantee, and a weighted fair share of unused output port bandwidth;

receiving, at plural input ports, cells for transmission through the switch to plural output ports, each cell being associated with a class;

queuing each received cell according to the input port in which it is received, its destination output port and its class;

tracking credits for each queue, wherein credits for each queue are determined based upon an amount of lag between a next theoretical request time of each queue and a time at which a cell is received for each queue;

generating a request for service for a cell by dynamically mapping the cell's class from a plurality of service classes to one of plural priority levels, there being fewer priority levels than service classes.

* * * * *